US009845876B2

(12) United States Patent
Tanabe et al.

(10) Patent No.: US 9,845,876 B2
(45) Date of Patent: Dec. 19, 2017

(54) GASKET AND METHOD OF PRODUCING GASKET

(71) Applicant: Nippon Pillar Packing Co., Ltd., Osaka-shi, Osaka (JP)

(72) Inventors: Hiroki Tanabe, Osaka (JP); Yuji Yanagitake, Osaka (JP); Yuta Sato, Osaka (JP)

(73) Assignee: NIPPON PILLAR PACKING CO., LTD., Osaka-Shi (JP)

( * ) Notice: Subject to any disclaimer, the term of this patent is extended or adjusted under 35 U.S.C. 154(b) by 20 days.

(21) Appl. No.: 14/808,471

(22) Filed: Jul. 24, 2015

(65) Prior Publication Data
US 2016/0025226 A1    Jan. 28, 2016

(30) Foreign Application Priority Data

Jul. 25, 2014 (JP) .................................. 2014-151778
Jul. 25, 2014 (JP) .................................. 2014-151779

(51) Int. Cl.
| | | |
|---|---|---|
| *F16J 15/10* | (2006.01) | |
| *F16J 15/12* | (2006.01) | |
| *B32B 37/10* | (2006.01) | |
| *B32B 37/14* | (2006.01) | |
| *B32B 37/16* | (2006.01) | |

(52) U.S. Cl.
CPC ............. *F16J 15/102* (2013.01); *B32B 37/10* (2013.01); *B32B 37/144* (2013.01); *B32B 37/16* (2013.01); *F16J 15/104* (2013.01); *F16J 15/108* (2013.01); *F16J 15/121* (2013.01); *F16J 15/126* (2013.01);

(Continued)

(58) Field of Classification Search
CPC   F16J 15/12; F16J 15/102; F16J 15/104; F16J 15/121; F16J 15/126
See application file for complete search history.

(56) References Cited

U.S. PATENT DOCUMENTS 1,636,363 A * 7/1927 Hettinger ............... F16J 15/121
                                              277/633
1,782,014 A * 11/1930 Rimmelspacher ..... F16J 15/121
                                              277/653
(Continued)

FOREIGN PATENT DOCUMENTS

| EP | 0945634 | 9/1999 |
|---|---|---|
| EP | 1473493 | 11/2004 |

(Continued)

OTHER PUBLICATIONS

European Search Report dated Dec. 22, 2015, 7 pages.

*Primary Examiner* — Eugene G Byrd
(74) *Attorney, Agent, or Firm* — Rankin, Hill & Clark LLP (57) ABSTRACT

A gasket in which a high sealing property can be ensured, and a method of producing such a gasket are provided. A gasket 1 is produced by spirally winding a belt-like composite body 13 having a metal mesh member 11 and expanded graphite 12 enveloped by the metal mesh member, and then compression molding the composite body into a tubular shape. The gasket includes a first sealing portion 21 placed in one axial end portion, and a second sealing portion 22 placed in the other axial end portion. The gasket has a sectional shape in which the composite body that is in a bent state overlaps in a radial direction. The composite body includes a bent portion which is radially bent in an acute angle shape.

2 Claims, 11 Drawing Sheets

(52) U.S. Cl.
CPC ....... *B32B 2305/38* (2013.01); *B32B 2313/04* (2013.01); *B32B 2581/00* (2013.01)

(56) References Cited

U.S. PATENT DOCUMENTS

| | | | | |
|---|---|---|---|---|
| 2,194,943 | A * | 3/1940 | Hubbard | F16J 15/12 |
| | | | | 277/627 |
| 3,230,290 | A * | 1/1966 | Nelson | B29D 99/0053 |
| | | | | 156/228 |
| 4,201,804 | A * | 5/1980 | Stecher | F16J 15/102 |
| | | | | 277/591 |
| 4,516,782 | A * | 5/1985 | Usher | F01N 13/1827 |
| | | | | 264/258 |
| 4,902,024 | A * | 2/1990 | Takenoshita | F01N 13/1827 |
| | | | | 156/192 |
| 5,040,805 | A * | 8/1991 | Ozora | F01N 13/1811 |
| | | | | 277/621 |
| 6,663,112 | B1 * | 12/2003 | Sporre | F16J 15/104 |
| | | | | 277/584 |
| 2009/0109607 | A1 * | 4/2009 | Rupp | F16J 15/102 |
| | | | | 361/679.01 |

FOREIGN PATENT DOCUMENTS

| | | |
|---|---|---|
| JP | 7-113469 | 5/1995 |
| JP | 2004-076692 | 3/2004 |
| JP | 2013-104550 | 5/2013 |

* cited by examiner

Fig.13 ated after execution of the end-portion shape adjusting step in the other method of

GASKET AND METHOD OF PRODUCING GASKET

TECHNICAL FIELD

The present invention relates to a gasket and a method of producing a gasket.

BACKGROUND ART

As a gasket to be used in a joint for pipes or the like, conventionally, a gasket configured by a metal mesh member and expanded graphite has been known. For example, the gasket disclosed in Patent Literature 1 is configured by a metal mesh member formed by a stainless steel wire or the like, and an inorganic member such as an expanded graphite sheet.

The gasket disclosed in Patent Literature 1 is produced by press-molding a metal mesh wrapped by a sheet-like inorganic member, into a cylindrical shape. In the gasket, sealing surfaces for pipes are merely provided on the axial end surfaces. Therefore, the gasket has room for improvement from the viewpoint of enhancement of the sealing property.

PRIOR ART LITERATURE

Patent Literature

Patent Literature 1: Japanese Patent Application Laid-Open No. 7-113469

SUMMARY OF THE INVENTION

Problems to be Solved by the Invention

The invention has been conducted in view of the above-discussed circumstances. It is an object of the invention to provide a gasket in which a high sealing property can be ensured, and a method of producing such a gasket.

Means for Solving the Problems

A first mode of the invention provides
a gasket which is configured by spirally winding a belt-like composite body having a metal mesh member and expanded graphite enveloped by the metal mesh member, and then compression molding the composite body into a tubular shape, wherein
the gasket includes a first sealing portion placed in one axial end portion, and a second sealing portion placed in another axial end portion, and has a sectional shape in which the composite body that is in a bent state overlaps in a radial direction, and
the composite body includes a bent portion which is radially bent in an acute angle shape.

According to a second mode of the invention, in the gasket of the first mode,
the sectional shape is formed by compression molding the composite body to enable the first sealing portion to have a first sealing surface which is tapered toward one axial end surface, and the second sealing portion to have a second sealing surface which is tapered toward another axial end surface.

A third mode of the invention provides a method of producing the gasket of the first mode, wherein the method has steps of:

preparing the metal mesh member and the expanded graphite;
placing the metal mesh member around the expanded graphite in a manner that a long belt-like composite body in which the expanded graphite is enveloped by the metal mesh member is formed;
adjusting shapes of longitudinal end portions of the composite body in such a manner that, in a short-side direction of the composite body, width dimensions of the longitudinal end portion of the composite body are smaller than a width dimension of a longitudinal middle portion of the composite body;
spirally winding the composite body in a manner that a tubular body in a multiply wound state in which an axial direction coincides with the short-side direction of the composite body is formed; and
compress molding the tubular body in an axial direction of the tubular body.

According to a fourth mode of the invention, in the method of producing a gasket of the third mode,
the composite body is spirally wound in a manner that the width dimension in a radial direction of the tubular body is substantially constant over a whole circumference of the tubular body.

Effects of the Invention

According to the invention, it is possible to provide a gasket in which a high sealing property can be ensured, and a method of producing such a gasket.

DESCRIPTION OF PREFERRED EMBODIMENTS

Preferred embodiments of the invention will be described with reference to the drawings.

Figure 1:
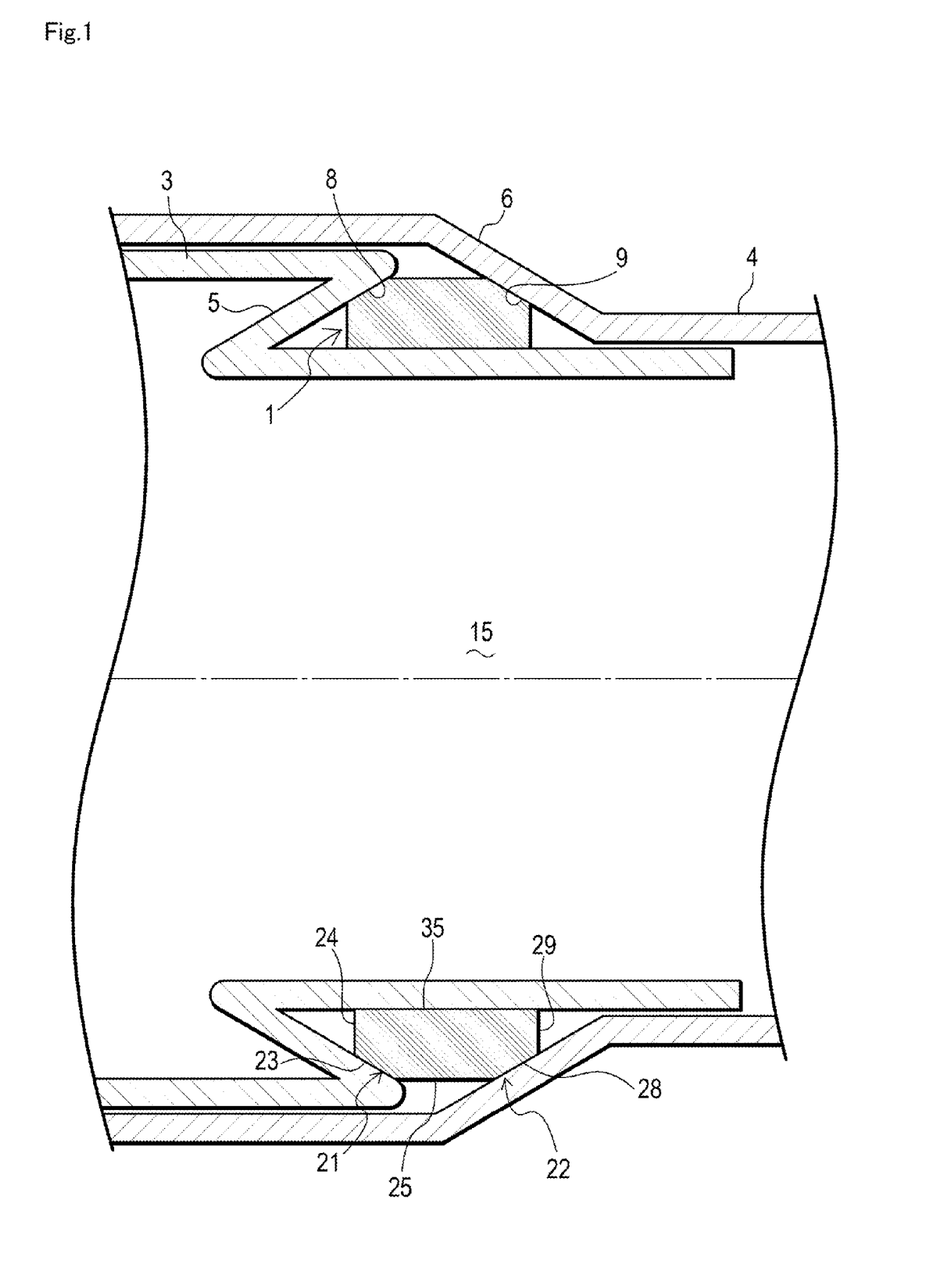
FIG. 1 is a sectional view showing a use state of a gasket of an embodiment of the invention.
Figure 2:
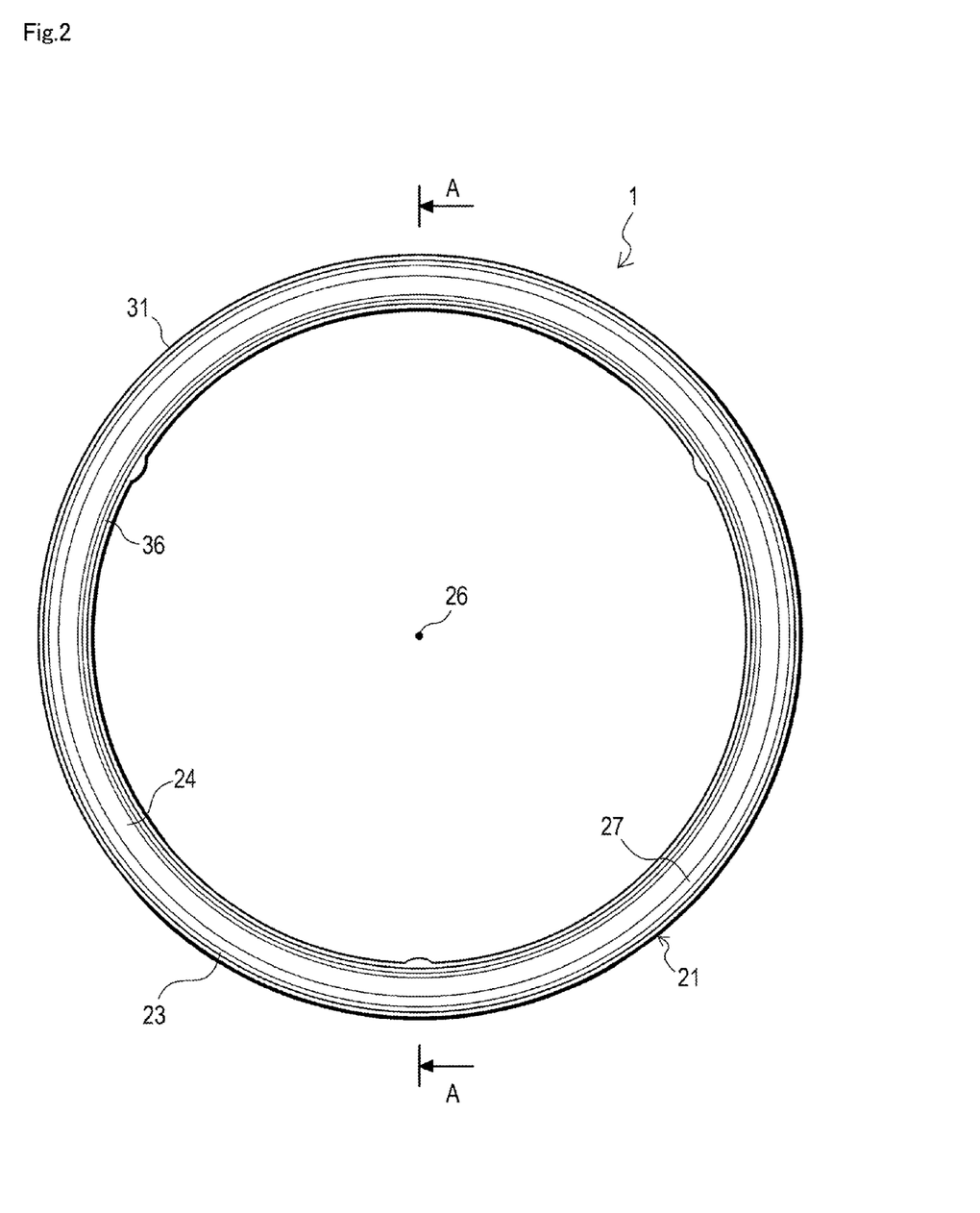
FIG. 2 is a front view of the gasket of FIG. 1.
Figure 3:
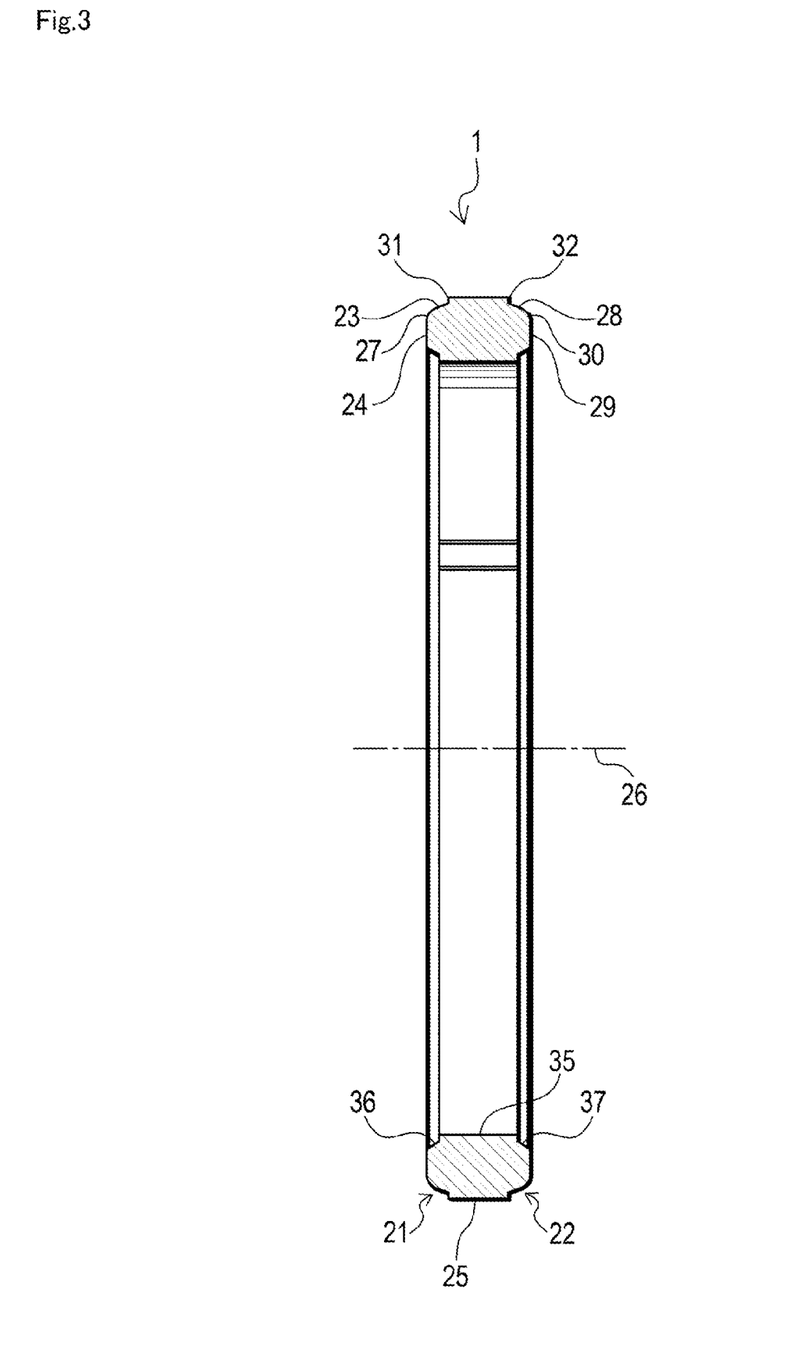
FIG. 3 is a sectional view taken along line A-A in FIG. 2.
Figure 4:
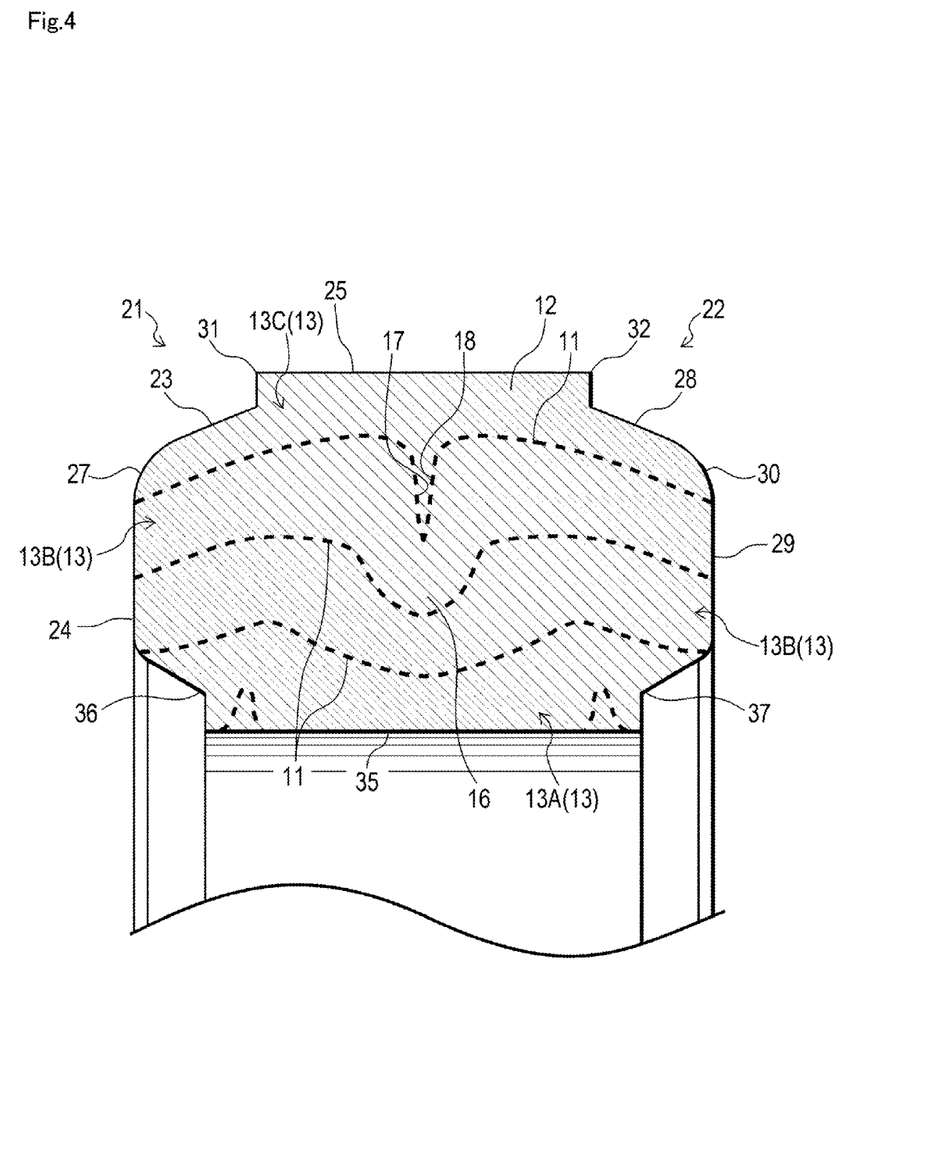
FIG. 4 is a partial enlarged view of FIG. 3.

FIG. 1 shows a use state of a gasket 1 of an embodiment of the invention, FIG. 2 is a front view of the gasket 1, FIG. 3 is a sectional view taken along line A-A in FIG. 2, and FIG. 4 is a partial enlarged view of FIG. 3.

As shown in FIG. 1, for example, the gasket 1 is used in a joint for exhaust pipes (first and second pipes 3, 4) of an automobile or the like. In use of the gasket 1 in the joint for exhaust pipes or the like, the gasket is interposed between the first and second pipes 3, 4 in order to seal the gap between opposed end portions of the first and second pipes 3, 4.

As shown in FIGS. 1 to 3, the gasket 1 is formed into an annular shape. When the gasket is to be used, the gasket is attached in a state where it is fitted onto the end portion of the first pipe 3, and clamped between a first contact portion (seal target member) 5 which is integrally (or separately) disposed in the end portion of the first pipe 3, and which is annular, and a second contact portion (seal target member) 6 which is integrally (or separately) disposed in the end portion of the second pipe 4, and which is annular.

As exaggeratedly shown in FIG. 4, the gasket 1 is configured by using a metal mesh member 11 and expanded graphite 12. The gasket 1 is produced by spirally winding a long belt-like composite body 13 having the metal mesh member 11 and the expanded graphite 12 enveloped by the metal mesh member, and then compression molding the composite body into a tubular (annular) shape. The method of producing the gasket 1 will be described later.

In the gasket 1, the composite body 13 exists so that multiple layers of the composite body radially overlap with one another, and metal wires configuring the metal mesh member 11, and the expanded graphite 12 mixedly exist. In the figure, illustration of detailed arrangements and configurations of the metal wires and the expanded graphite is appropriately omitted.

The gasket 1 includes sealing portions for preventing fluid from leaking from a flow path 15 in the first and second pipes 3, 4 which are connected to each other. In the embodiment, as shown in FIGS. 1 to 4, the gasket 1 includes a first sealing portion 21 and a second sealing portion 22.

The first sealing portion 21 is disposed in one axial end portion of the gasket 1, and placed in the radially outer side of the gasket 1. The first sealing portion 21 has a first sealing surface 23 which is tapered toward one axial end surface 24 of the gasket 1.

The first sealing surface 23 is contactable with the first contact portion 5 (specifically, its opposed surface 8 which is annular and inclined), and disposed in a portion which is located in the outer circumferential side of the composite body 13 that is in a multiply wound state after the compression molding. The first sealing surface 23 is placed between the one axial end surface 24 which is opposed to the first contact portion 5, and the outer circumferential surface 25 of the gasket 1.

In the embodiment, the first sealing surface 23 is formed into a tapered shape in which the diameter is gradually reduced as proceeding from the side of the outer circumferential surface 25 (the axial center of the gasket 1) toward the one axial end surface 24. In the embodiment, as shown in FIG. 4, the one axial end surface 24 is formed so as to linearly extend in a radial direction, and the outer circumferential surface 25 is formed so as to linearly extend in the axial direction.

The first sealing surface 23 is connected to the one axial end surface 24 in a reduced-diameter side end portion 27 which is located on one axial end side. The reduced-diameter side end portion 27 of the first sealing surface 23 is formed so as to, in a section including the axis 26 of the gasket 1, exhibit an arcuate shape (rounded shape) which is convex to the outside in one axial direction of the gasket 1 and in a radially outward direction.

When, as shown in FIG. 1, the gasket 1 is used in the joint for the first and second pipes 3, 4 while being interposed between the first and second contact portions 5, 6 that are adjacent to each other in the axial direction, the first sealing portion 21 is pressed against the first contact portion 5 so as to be compressively deformed, and the first sealing surface 23 is press-contacted with the first contact portion 5 (opposed surface 8).

By contrast, the second sealing portion 22 is disposed in another axial end portion of the gasket 1, and placed in the radially outer side of the gasket 1. The second sealing portion 22 has a second sealing surface 28 which is tapered toward the other axial end surface 29 of the gasket 1.

The second sealing surface 28 is contactable with the second contact portion 6 (specifically, its opposed surface 9 which is annular and inclined), and disposed in a portion which is located in the outer circumferential side of the composite body 13 that is in a multiply wound state after the compression molding. The second sealing surface 28 is placed between the other axial end surface 29 which is opposed to the second contact portion 6, and the outer circumferential surface 25 of the gasket 1.

In the embodiment, the second sealing surface 28 is formed into a tapered shape in which the diameter is gradually reduced as proceeding from the side of the outer circumferential surface 25 (axial center of the gasket 1) toward the other axial end surface 29. In the embodiment, as shown in FIG. 4, the other axial end surface 29 is formed so as to linearly extend in a radial direction.

The second sealing surface 28 is connected to the other axial end surface 29 in a reduced-diameter side end portion 30 which is located on the other axial end side. The reduced-diameter side end portion 30 of the second sealing surface 28 is formed so as to, in a section including the axis 26 of the gasket 1, exhibit an arcuate shape (rounded shape) which is convex to the outside in the other axial direction of the gasket 1 and in a radially outward direction.

When, as shown in FIG. 1, the gasket 1 is used in the joint for the first and second pipes 3, 4, the second sealing portion 22 is pressed against the second contact portion 6 so as to be compressively deformed, and the second sealing surface 28 is press-contacted with the second contact portion 6 (opposed surface 9).

As shown in FIG. 4, the gasket 1 has a sectional shape in which the composite body 13 that is caused to have a bent state by the above-described compression molding overlaps in a radial direction of the gasket 1. In the gasket 1, the composite body 13 includes a first bent portion 16 which is radially bent in an acute angle shape.

In the embodiment, the composite body 13 has an inner-circumference composite body portion 13A, a plurality of intermediate composite body portions 13B, and an outer-circumference composite body portion 13C. The inner-circumference composite body portion 13A, the plurality of intermediate composite body portions 13B, and the outer-circumference composite body portion 13C are stacked together in this sequence in the direction from the radially inner circumferential side of the gasket 1 toward the outer circumferential side.

The plurality of intermediate composite body portions 13B are bent at a degree of bending which is different from the degrees of bending of the adjacent composite body portions, and include a bent portion that projects toward the radially inner side, in an axial middle portion. At least one of the intermediate composite body portions 13B is bent into a V-like sectional shape in the axial middle portion so that the bent portion is formed as the first bent portion 16.

The first bent portion 16 has inclined surfaces 17, 18 which are opposed to each other. The first bent portion 16 is formed in such a manner that the angle formed by the inclined surfaces 17, 18 is an acute angle so that the inclined surfaces 17, 18 are adjacent to each other with a predetermined gap (or contacted with each other) in a section including the axis 26 of the gasket 1.

In the embodiment, the first bent portion 16 is formed into a shape which is symmetrical in the axial direction of the gasket 1. The first bent portion 16 is placed in an axially central portion of the gasket 1 so that the first bent portion is located at a position which is equidistant from the first and second sealing portions 21, 22.

According to the configuration, when the gasket 1 is attached to an end portion of the first pipe 3 so as to be clamped between the first and second contact portions 5, 6, the contact surface pressure in contact between the first sealing surface 23 of the first sealing portion 21 and the opposed surface 8, and that in contact between the second sealing surface 28 of the second sealing portion 22 and the opposed surface 9 can be increased by using the repulsive force caused by bending of the composite body 13, particularly the composite body portions 13B including the first bent portion 16. Therefore, a high sealing property can be ensured in the first sealing portion 21 and the second sealing portion 22.

In the embodiment, in production (a compression molding step which will be described later) of the gasket 1, the composite body 13 is compression molded so that the first sealing portion 21 has the first sealing surface 23 which is tapered toward the one axial end surface, and the second sealing portion 22 has the second sealing surface 28 which is tapered toward the other axial end surface. This causes the above-described sectional shape to be formed.

According to the configuration, in the gasket 1, the contact surface pressure between the first sealing portion 21 and the opposed surface 8 can be further increased. Moreover, the contact surface pressure between the second sealing portion 22 and the opposed surface 9 can be further increased. As a result, the sealing properties of the first sealing portion 21 and the second sealing portion 22 can be improved.

In the embodiment, as shown in FIGS. 2 to 4, the first sealing portion 21 further has a first projecting portion 31 which projects to the outside of the gasket 1, in addition to the first sealing surface 23. The first sealing portion 21 is configured so as to exert a sealing function while using the first sealing surface 23 and the first projecting portion 31.

Specifically, the first projecting portion 31 is disposed in a portion which is located in the outermost circumference of the composite body 13 that is in the multiply wound state after the compression molding. The first projecting portion 31 is molded so as to be placed between the first sealing surface 23 and the outer circumferential surface 25 of the gasket 1, and continuous to the first sealing surface 23 and the outer circumferential surface 25.

The first projecting portion 31 is formed so as to project with respect to the first sealing surface 23 in a direction along which the portion intersects with the first sealing surface. In the embodiment, the first projecting portion 31 is formed into a pointed shape so as to project from the first sealing surface 23 toward a radially outer side, and from the outer circumferential surface 25 toward the axial one side.

When the gasket 1 is interposed between the first and second contact portions 5, 6, the first sealing portion 21 is pressed against the opposed surface 8 of the first contact portion 5, and, while the first projecting portion 31 is compressively deformed toward the radially inner side of the gasket 1 so as to collapse, the first sealing surface 23 and the first projecting portion 31 are press-contacted with the first contact portion 5.

According to the configuration, when the first sealing portion 21 is to be press-contacted with the first contact portion 5 (opposed surface 8) in order to exert a sealing function, the first sealing surface 23 can be made contact with the opposed surface 8 at the same time when the first projecting portion 31 is contacted with the opposed surface 8 while collapsing, and the first sealing portion 21 can be made contact with the first contact portion 5 at a higher contact surface pressure. Therefore, the sealing property of the first sealing portion 21 can be enhanced.

In the embodiment, as shown in FIGS. 3 and 4, the second sealing portion 22 further has a second projecting portion 32 which projects to the outside of the gasket 1, in addition to the second sealing surface 28. The second projecting portion 32 is configured so as to exert a sealing function while using the second sealing surface 28 and the second projecting portion 32.

Specifically, the second projecting portion 32 is disposed in a portion which is located in the outermost circumference of the composite body 13 that is in the multiply wound state after the compression molding. The second projecting portion 32 is molded so as to be placed between the second sealing surface 28 and the outer circumferential surface 25 of the gasket 1, and continuous to the second sealing surface 28 and the outer circumferential surface 25.

The second projecting portion 32 is formed so as to project with respect to the second sealing surface 28 in a direction along which the portion intersects with the second sealing surface. In the embodiment, the second projecting portion 32 is formed into a pointed shape so as to project from the second sealing surface 28 toward a radially outer side, and from the outer circumferential surface 25 toward the axial other side.

When the gasket 1 is interposed between the first and second contact portions 5, 6, the second sealing portion 22 is pressed against the opposed surface 9 of the second contact portion 6, and, while the second projecting portion 32 is compressively deformed toward the radially inner side of the gasket 1 so as to collapse, the second sealing surface 28 and the second projecting portion 32 are press-contacted with the second contact portion 6.

According to the configuration, when the second sealing portion 22 is to be press-contacted with the second contact portion 6 (opposed surface 9) in order to exert a sealing function, the second sealing surface 28 can be made contact with the opposed surface 9 at the same time when the second projecting portion 32 is contacted with the opposed surface 9 while collapsing, and the second sealing portion 22 can be made contact with the second contact portion 6 at a higher contact surface pressure. Therefore, the sealing property of the second sealing portion 22 can be enhanced.

In the embodiment, as shown in FIGS. 2 to 4, a first chamfered portion 36 is formed between the one axial end surface 24 of the gasket 1 and the inner circumferential surface 35 of the gasket 1. The first chamfered portion 36 has an inclined surface in which the diameter is gradually increased as proceeding from the inner circumferential surface 35 toward the one axial end surface 24, and is disposed over the whole circumference of the gasket 1.

In the embodiment, as shown in FIGS. 3 and 4, a second chamfered portion 37 is formed between the other axial end surface 29 of the gasket 1 and the inner circumferential surface 35 of the gasket 1. The second chamfered portion 37 has an inclined surface in which the diameter is gradually increased as proceeding from the inner circumferential surface 35 toward the other axial end surface 29, and is disposed over the whole circumference of the gasket 1.

In the embodiment, as shown in FIGS. 3 and 4, the gasket 1 is formed into a shape which is symmetrical in the axial direction. In the gasket 1, namely, the first sealing portion 21 and the second sealing portion 22, and the first chamfered portion 36 and the second chamfered portion 37 have a shape which is symmetrical in the axial direction. Moreover, the first bent portion 16 in the composite body 13 has a shape which is symmetrical in the axial direction.

According to the configuration, when the gasket 1 is attached to an end portion of the first pipe 3, a high sealing property is easily exerted irrespective of the direction of the gasket 1. In attachment to the first and second pipes 3, 4, therefore, it is not necessary to consider the direction of the gasket 1, and hence the workability can be improved.

Next, a method of producing the gasket 1 will be described.

The method of producing the gasket 1 includes a material preparing step, a composite body forming step, a composite body flattening step, a tubular body forming step, and the compression molding step. The steps are advanced in this sequence.

Figure 5:
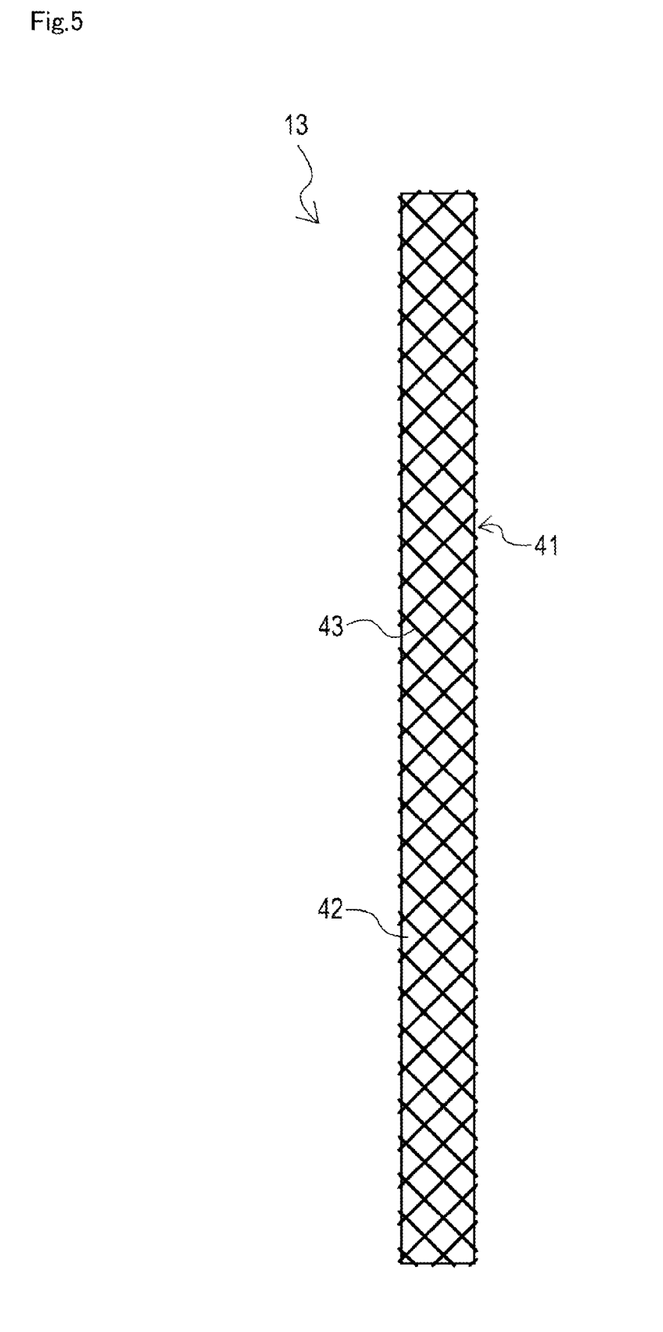
FIG. 5 is a front view of a composite body which is used in execution of a method of producing the gasket of FIG. 1.

In the material preparing step, a metal mesh member 41 and expanded graphite tape 42 which are shown in FIG. 5 are prepared. The metal mesh member 41 is used as the metal mesh member 11 of the gasket 1 after production, and the expanded graphite tape 42 is used as the expanded graphite 12 of the gasket 1.

The metal mesh member 41 is formed by knitting metal wires 43 by a predetermined knitting method such as a loop-forming knitting method. In the embodiment, the metal mesh member 41 is formed into a laterally elongated tubular shape in which the longitudinal direction coincides with the axial direction (vertical direction).

Metal wires having a predetermined wire diameter (thickness) are employed as the metal wires 43. For example, the metal wires 43 are stainless steel wires having a diameter of about 0.1 to 0.3 mm (preferably, 0.15 mm).

In the longitudinal direction, the expanded graphite tape 42 has a width dimension which is approximately equal to that of the metal mesh member 41. The expanded graphite tape 42 has a predetermined width dimension in the short-side direction, and a predetermined thickness dimension in the thickness direction so as to be insertable into the tubular metal mesh member 41.

In the embodiment, expanded graphite which is formed into a tape-like shape (expanded graphite tape) as shown in FIG. 5 is employed as the expanded graphite which is a material to be prepared in the material preparing step. Alternatively, expanded graphite which is cut into a strip-like shape or a linear shape (narrow width) may be employed, or granular expanded graphite may be employed.

In the composite body forming step, as shown in FIG. 5, the metal mesh member 41 is placed around the expanded graphite tape 42 so as to form the long belt-like composite body 13 in which the expanded graphite tape 42 is enveloped by the metal mesh member 41.

In the composite body flattening step, the composite body 13 is molded into a flat shape. This causes the composite body 13 to be formed into a flat long rectangular shape in which the metal wires 43 of the metal mesh member 41 are closely stuck to the surface of the expanded graphite tape 42.

Figure 6:
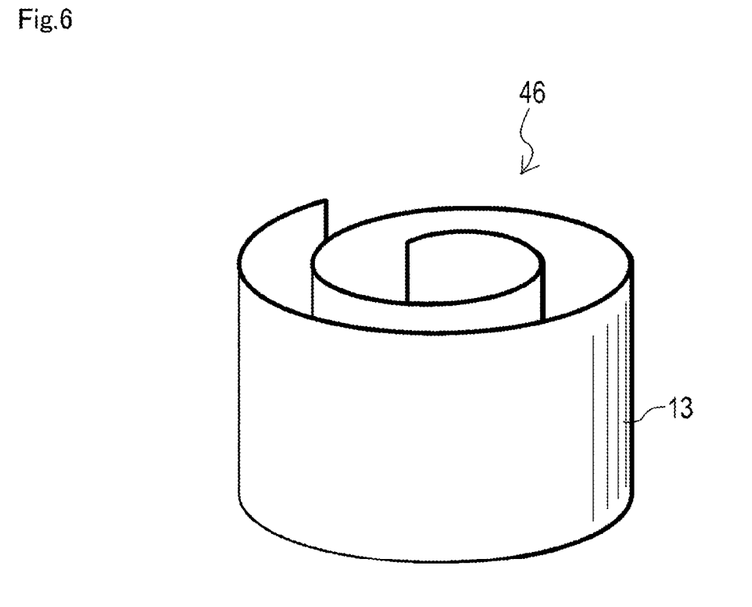
FIG. 6 is a perspective view showing a state in progress of a step of producing the gasket of FIG. 1.

In the tubular body forming step, as shown in FIG. 6, the composite body 13 is spirally wound so as to form a spirally wound tubular body 46 in a multiply wound state in which the axial direction coincides with the short-side direction of the composite body 13. At this time, the winding number is adequately set in accordance with the thickness required in the gasket 1 to be produced.

Figure 7:
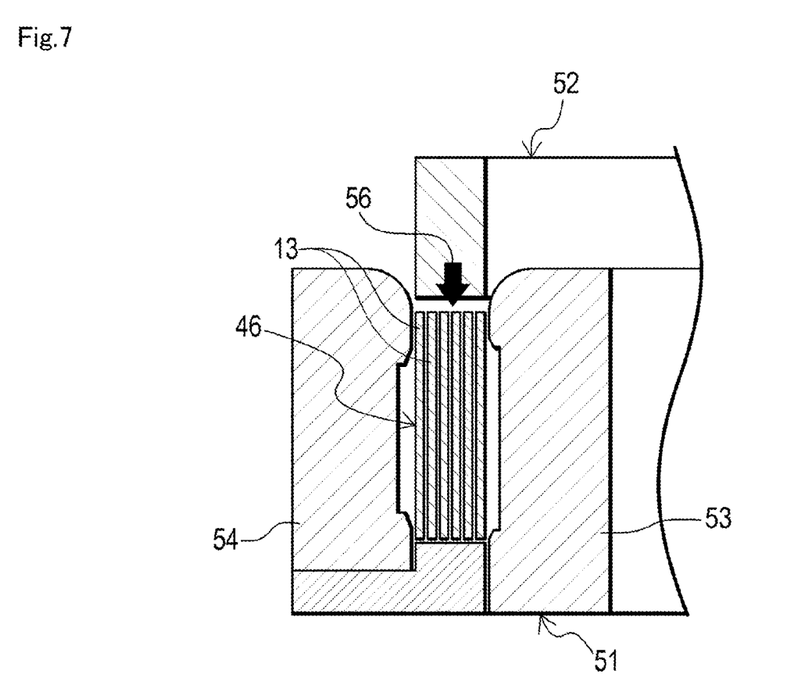
FIG. 7 is a schematic sectional view showing a state in progress of a step of producing the gasket of FIG. 1.

In the compression molding step, the spirally wound tubular body 46 is compression molded in the axial direction. For example, the compression molding step is executed so that, as shown in FIG. 7, the composite body 13 is folded in the axial direction by using a stationary die 51 corresponding to the shape of the gasket 1, and a movable die 52 which is reciprocable to and from the stationary die 51.

Firstly, the spirally wound tubular body 46 is disposed between, in the stationary die 51, an inner stationary die 53 and an outer stationary die 54 while the tubular body is fitted onto the inner stationary die 53. Then, the movable die 52 is moved in the direction of the arrow 56 to be pressed in between the inner stationary die 53 and the outer stationary die 54. In this way, the spirally wound tubular body 46 is axially and radially compression molded.

When the compression molding step is completed, it is possible to obtain the gasket 1 including the first sealing portion 21 and the second sealing portion 22. In the obtained gasket 1, as described above, the composite body 13 exists in the state where it is folded in the axial direction so as to have the first bent portion 16.

The method of producing the gasket 1 may further include an end-portion shape adjusting step in addition to the plurality of steps. In the other production method, the end-portion shape adjusting step is performed after the composite body forming step and between the composite body flattening step and the tubular body forming step.

Figure 8:
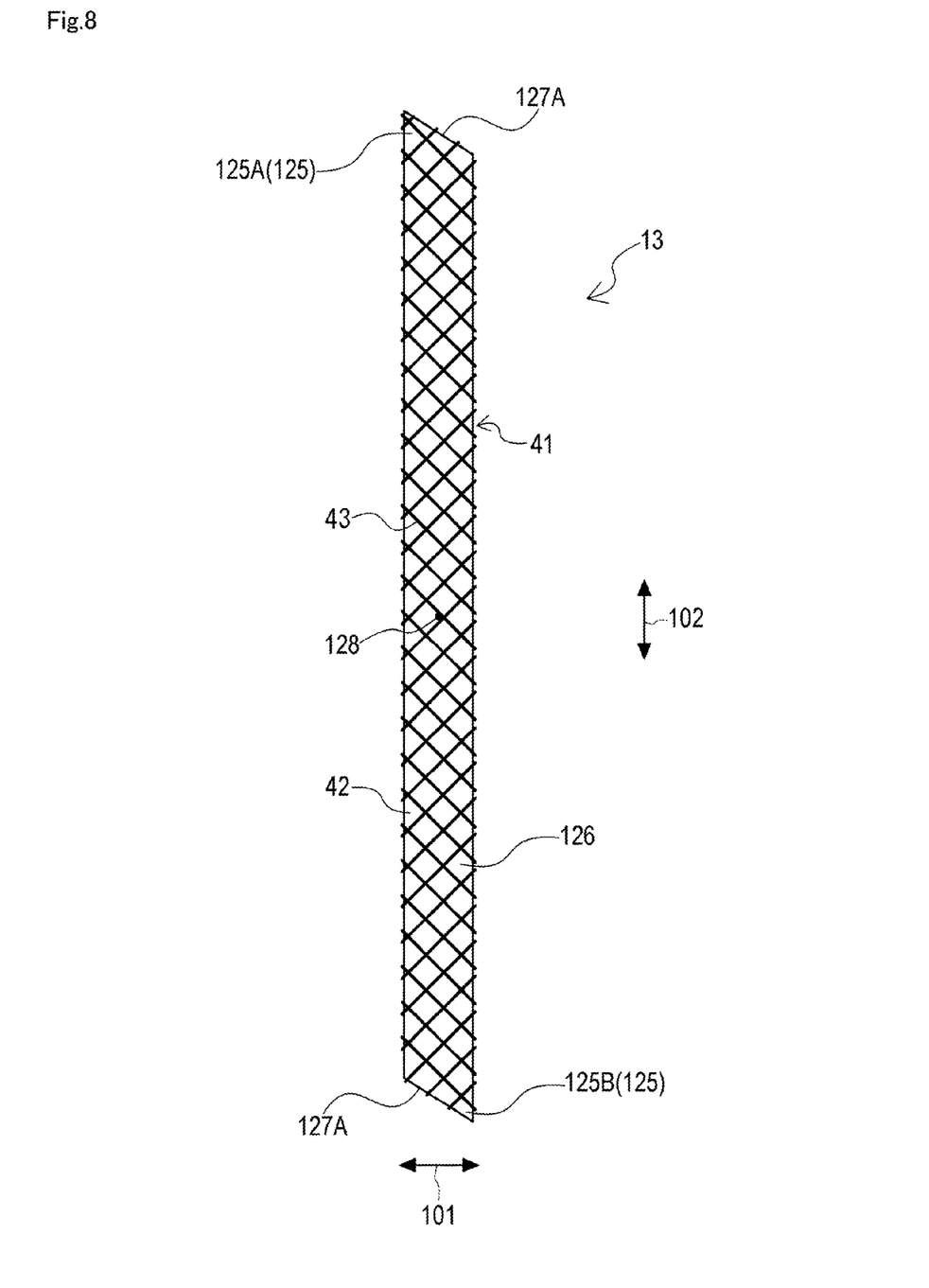
FIG. 8 is a front view of a composite body which is obtained after execution of an end-portion shape adjusting step in another method of producing the gasket of FIG. 1.

In the end-portion shape adjusting step, with respect to the short-side direction (direction of the arrow 101) of the composite body 13 which has undergone the composite body flattening step, as shown in FIG. 8, the shapes of end portions 125 in the longitudinal direction (direction of the arrow 102) of the composite body 13 are adjusted so that the width dimensions of the end portions 125 of the composite body 13 are smaller than the width dimension of a longitudinal middle portion 126 of the composite body 13.

Here, the longitudinal end portions 125 of the composite body 13 are formed into an adequate shape so that the width dimensions in the short-side direction of the end surfaces and their vicinities are equal to or smaller than ¾ (preferably, ½) of the width dimension in the short-side direction of the longitudinal middle portion 126.

Since the composite body 13 has a long rectangular shape, each of end portions 125A, 125B which are the longitudinal end portions 125 of the composite body 13 is formed into a shape which is partially notched, by cutting away one of two edge portions of the end portion 125A or 125B with a cutting plane 127A that extends linearly and obliquely with respect to the longitudinal direction.

It is assumed that the end portions 125A, 125B which have been adjusted in the end-portion shape adjusting step are formed into a tapered shape in which, as proceeding from the longitudinal middle portion 126 having the predetermined width toward the respective end surfaces, the width dimension in the short-side direction of the composite body 13 is gradually reduced. The shapes of the end portions 125A, 125B are point-symmetrical with respect to the center 128 of the composite body 13.

Figure 9A:
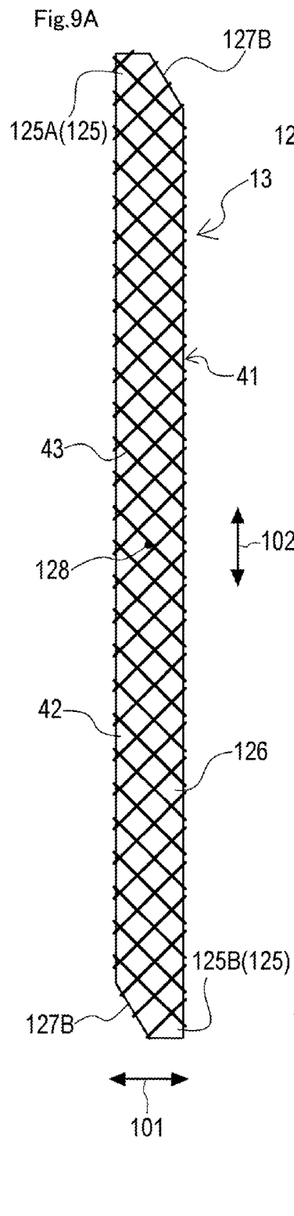
FIG. 9A is a front view of a composite body of another example which is obtained after execution of the end-portion shape adjusting step in the other method of producing the gasket of FIG. 1.
Figure 9B:
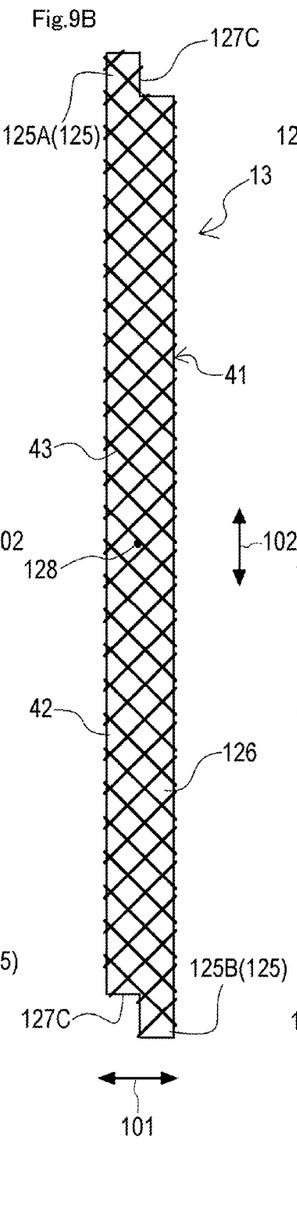
FIG. 9B is a front view of a composite body of a further example which is obtained after execution of the end-portion shape adjusting step in the other method of producing the gasket of FIG. 1.
Figure 9C:
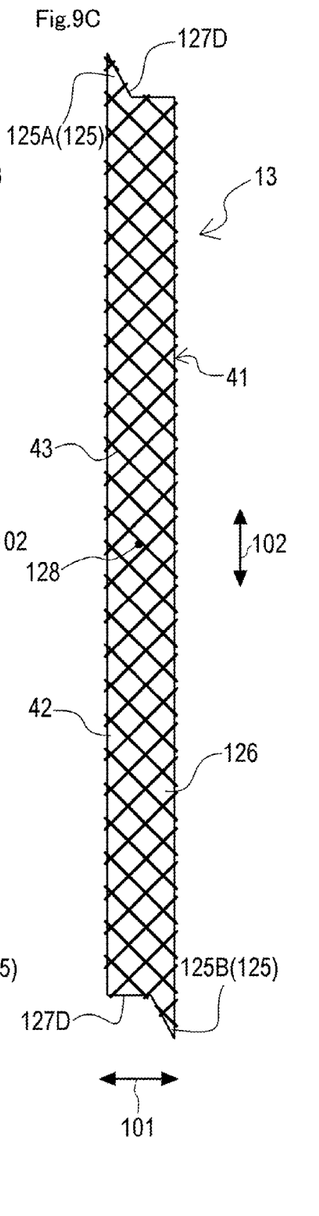
FIG. 9C is a front view of a composite body of a still further example which is obtained after execution of the end-portion shape adjusting step in the other method of producing the gasket of FIG. 1.

In the end-portion shape adjusting step, the shapes of the end portions may be adjusted so that, as shown in FIG. 9A, the cutting planes of the end portions 125 are cutting planes 127B having an inclination angle which is smaller than the inclination angles of the cutting planes 127A in the embodiment. Alternatively, the shapes of the end portions may be adjusted so that, as shown in FIGS. 9B and 9C, the cutting planes of the end portions 125 are cutting planes 127C or 127D which are bent one time (or a plurality of times) in a middle portion.

Figure 10A:
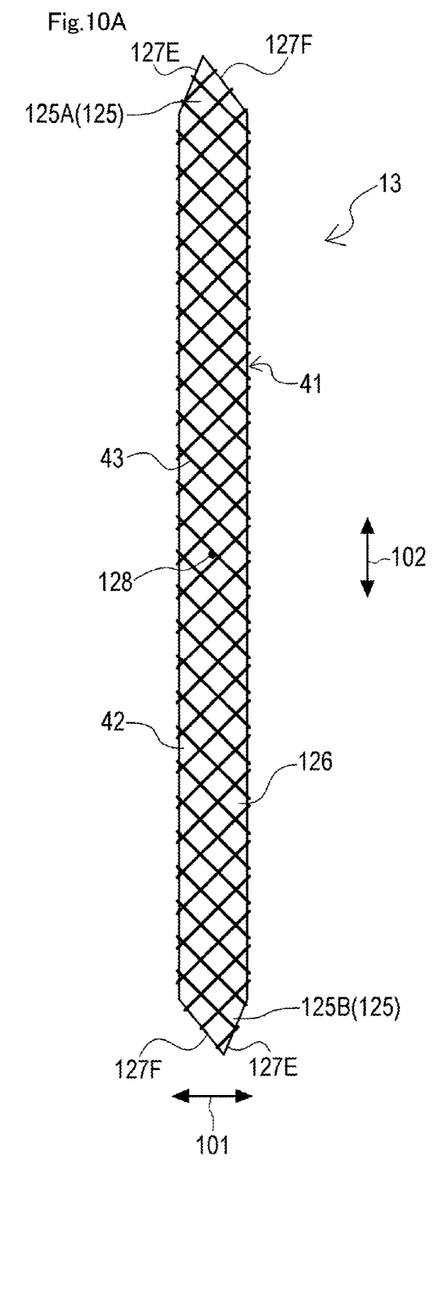
FIG. 10A is a front view of a composite body of a still further example which is obtained after execution of the end-portion shape adjusting step in the other method of producing the gasket of FIG. 1.
Figure 10B:
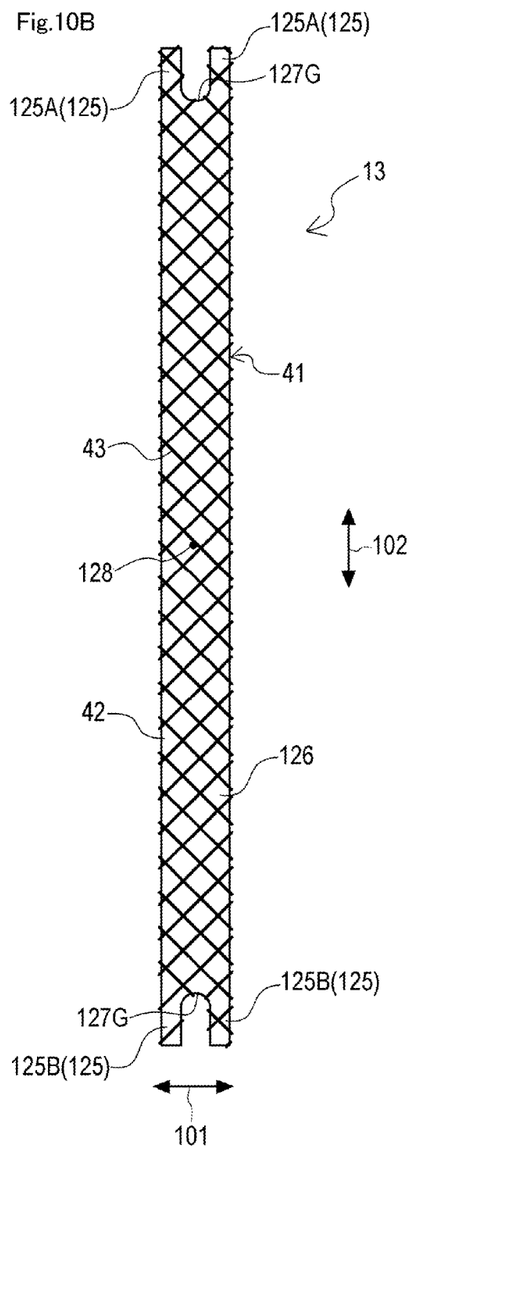
FIG. 10B is a front view of the composite body of a still further example which is obtained after execution of the end-portion shape adjusting step in the other method of producing the gasket of FIG. 1.

In the end-portion shape adjusting step, the shapes of the end portions may be adjusted so that, as shown in FIG. 10A, the cutting planes of the end portions 125 are cutting planes 127E, 127F which are located on the both sides in the short-side direction, respectively, and which have a predetermined inclination angle. Alternatively, the shapes of the end portions may be adjusted by branching the end portions so that, as shown in FIG. 10B, the cutting planes of the end portions 125 are cutting planes 127G which are respectively concavely formed in middle portions in the short-side direction.

Figure 11A:
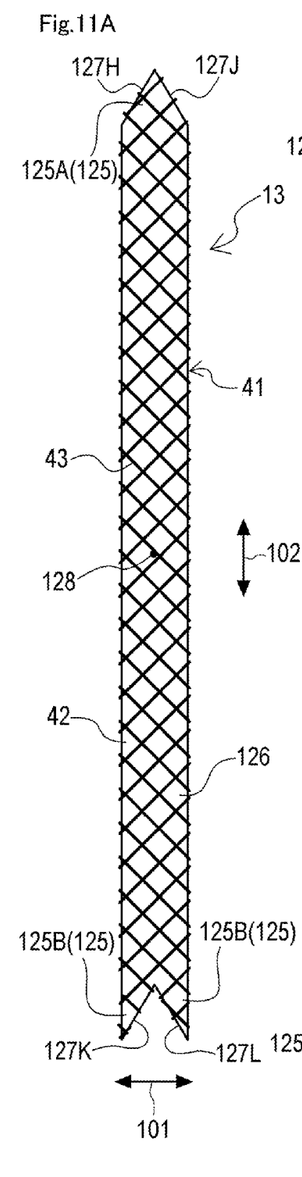
FIG. 11A is a front view of a composite body of a still further example which is obtained after execution of the end-portion shape adjusting step in the other method of producing the gasket of FIG. 1.
Figure 11B:
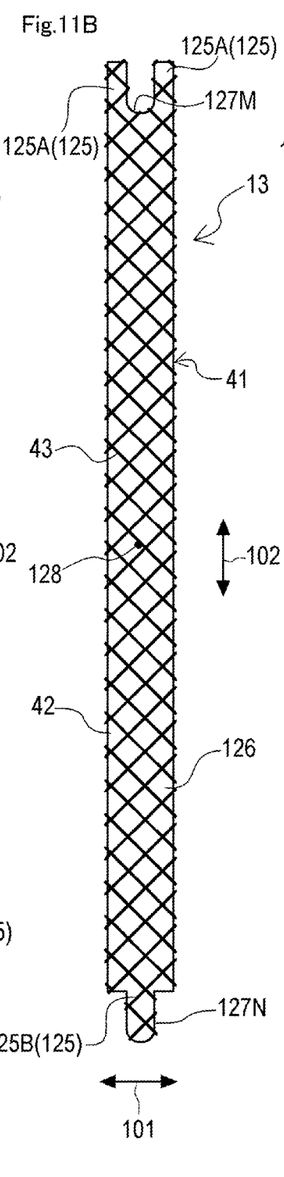
FIG. 11B is a front view of a composite body of a still further example which is obtained after execution of the end-portion shape adjusting step in the other method of producing the gasket of FIG. 1.
Figure 11C:
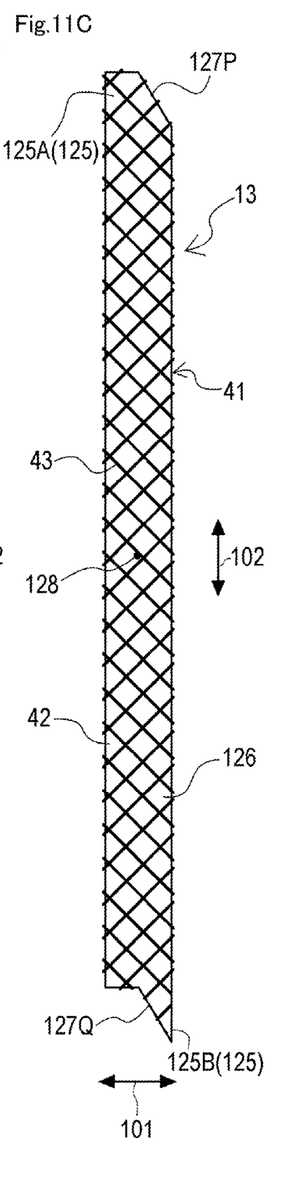
FIG. 11C is a front view of a composite body of a still further example which is obtained after execution of the end-portion shape adjusting step in the other method of producing the gasket of FIG. 1.

In consideration of the productivity and the yield, the one end portion 125A and the other end portion 125B may be formed into shapes (convex and concave shapes) which are mutually different but correspondent, respectively. In the end-portion shape adjusting step, therefore, the shapes of the end portions may be adjusted so that, as shown in FIG. 11A, the cutting planes of the end portions 125A, 125B are: cutting planes 127H, 127J and 127K, 127L, respectively; as shown in FIG. 11B, cutting planes 127M, 127N, respectively; or, as shown in FIG. 11C, cutting planes 127P, 127Q, respectively.

Figure 12:
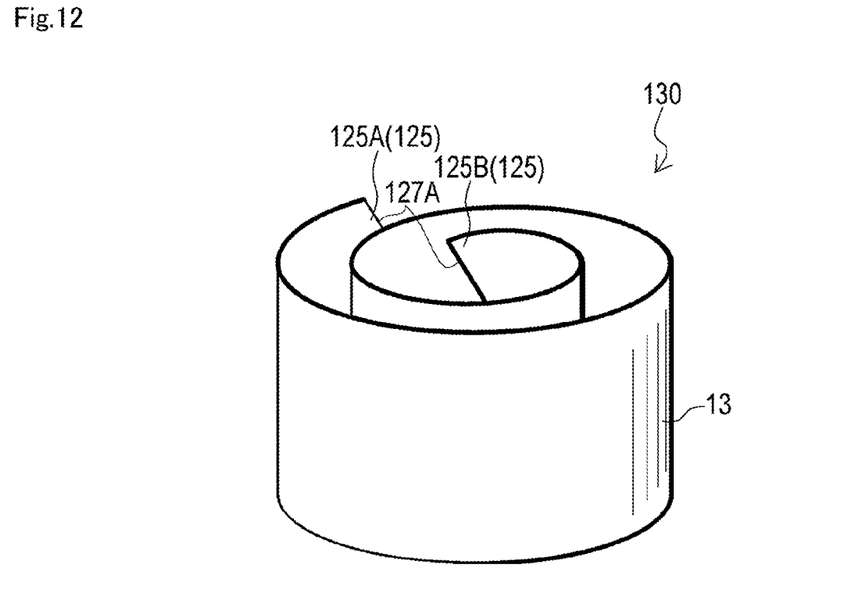
FIG. 12 is a view showing a state of a tubular body forming step in the other method of producing the gasket of FIG. 1.
Figure 13:
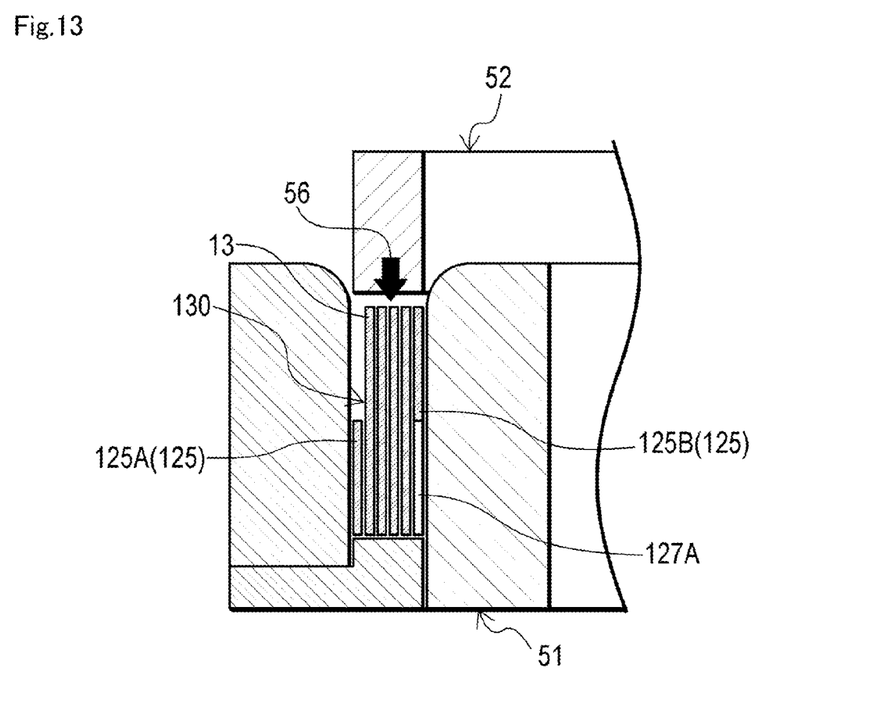
FIG. 13 is a view showing a state of a compression molding step in the other method of producing the gasket of FIG. 1.

In the other production method, after the end-portion shape adjusting step, the tubular body forming step and the compression molding step are performed on the composite body 13 in which the shapes of the end portions have been adjusted (see FIGS. 12 and 13). In the compression molding step, therefore, it is possible to cause an external force in the compression direction (direction of the arrow 56) due to the movable die 52 to be hardly applied to end portions of a spirally wound tubular body 130 (i.e., the end portions 125 of the composite body 13).

In the compression molding step, therefore, the end portions (particularly, the metal wires 43) of the spirally wound tubular body 130 can be prevented from being excessively deformed (protruding into gaps or the like which exist in the stationary die 51, to cause biting), and the gasket 1 can be prevented from burring. In the case where the above-described production method is used, therefore, a molding failure of the gasket 1 can be suppressed from occurring.

In the obtained gasket 1, moreover, the portion in the composite body 13 (in the embodiment, the outer-circumference composite body portion 13C) which is adjacent to the first bent portion 16 can be clamped by the first bent portion 16. Therefore, the overlapping portions of the composite body 13 are caused to be hardly dissociated, and a shape failure of the gasket 1 can be suppressed from occurring. As a result, the shape of the gasket 1 can be stabilized, and a high sealing property can be easily ensured.

In the tubular body forming step which is performed after the end-portion shape adjusting step, preferably, the composite body 13 is spirally wound so that the width dimension in a radial direction of the spirally wound tubular body 130 is substantially constant over the whole circumference of the spirally wound tubular body 130. In the spirally wound tubular body 130, namely, the number of the composite bodies 13 which are juxtaposed in a radial direction is made substantially constant at any position in the circumferential direction.

According to the configuration, in the gasket 1 which is obtained after the compression molding step, the density and the width dimension in the axial direction can be made substantially constant over the whole circumference of the gasket. In the case where the method of producing a gasket of the embodiment is used, therefore, the molding can be stably performed.

DESCRIPTION OF REFERENCE NUMERALS 1 gasket
11 metal mesh member
12 expanded graphite
13 composite body
16 bent portion
21 first sealing portion
22 second sealing portion
23 first sealing surface
28 second sealing surface
31 first projecting portion
32 second projecting portion
125 (125A, 125B) longitudinal end portion of composite body
126 longitudinal middle portion of composite body

The invention claimed is:

1. A gasket that is configured by spirally winding a belt-like composite body having a metal mesh member and expanded graphite enveloped by the metal mesh member, and then compression molding the composite body into a tubular shape, wherein the gasket includes a first sealing portion placed in one axial end portion, and a second sealing portion placed in another axial end portion, the composite body includes an inner-circumference composite body portion at a radially inner circumferential side of the gasket, an outer-circumference composite body portion at an outer circumferential side of the gasket, and a plurality of intermediate composite body portions disposed between the inner-circumference composite body portion and the outer-circumference composite body portion, each of the composite body portions being defined by the metal mesh member, said composite body having a section shape that is in a bent state such that adjacent composite body portions overlap in both a radial direction and an axial direction of the gasket; and at least one of the intermediate composite body portions includes a bent portion that is radially bent in an acute angle shape.

2. The gasket according to claim 1, wherein the sectional shape is formed by compression molding the composite body to enable the first sealing portion to have a first sealing surface that is tapered toward one axial end surface, and the second sealing portion to have a second sealing surface that is tapered toward another axial end surface.

* * * * *